(12) United States Patent
Motowaki (10) Patent No.: US 10,739,273 B2
(45) Date of Patent: Aug. 11, 2020

(54) INSPECTION APPARATUS AND INSPECTION METHOD

(71) Applicant: FANUC CORPORATION, Yamanashi (JP)

(72) Inventor: Yoshio Motowaki, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 18 days.

(21) Appl. No.: 16/353,203

(22) Filed: Mar. 14, 2019

(65) Prior Publication Data

US 2019/0285553 A1 Sep. 19, 2019

(30) Foreign Application Priority Data

Mar. 19, 2018 (JP) .................................. 2018-051179

(51) Int. Cl.
*G06T 7/00* (2017.01)
*G01N 21/88* (2006.01)
*G01N 21/95* (2006.01)
*G01B 11/06* (2006.01)

(52) U.S. Cl.
CPC ......... *G01N 21/8806* (2013.01); *G01B 11/06* (2013.01); *G01B 11/0616* (2013.01); *G01N 21/8851* (2013.01); *G01N 21/95* (2013.01); *G06T 7/0004* (2013.01)

(58) Field of Classification Search
CPC .......... G01N 21/8806; G01N 21/8851; G01N 21/95; G01N 11/06; G01N 11/0616; G06T 7/0004
See application file for complete search history.

(56) References Cited

U.S. PATENT DOCUMENTS

| 2005/0219554 A1 | 10/2005 | Tobiason et al. |
| 2006/0050264 A1 | 3/2006 | Jung et al. |
| 2007/0034140 A1* | 2/2007 | Thorne .................. C30B 29/58 117/68 |

(Continued)

FOREIGN PATENT DOCUMENTS

| JP | 2000121338 A | 4/2000 |
| JP | 2006-313147 A | 11/2006 |

(Continued)

OTHER PUBLICATIONS

Notice of Reasons for Refusal issued by the Japanese Patent Office in relation to Japanese Application No. 2018-051179 dated Jan. 14, 2020 (4 pages) English translation only.

(Continued)

*Primary Examiner* — Ping Y Hsieh
(74) *Attorney, Agent, or Firm* — Robert P. Michal, Esq.; Carter, DeLuca & Farrell LLP (57) ABSTRACT

An inspection apparatus for inspecting an inspection object having a coating layer includes: multiple light emitters configured to emit light beams each having an annular cross-section onto the coating layer; an imaging unit configured to take an image of a light beam reflected on the coating layer; a counter configured to count the number of annular light beam images per unit area in the image taken by the imaging unit; and a thickness determination unit configured to determine whether or not the thickness of the coating layer is acceptable, based on the number of the annular light beam images counted by the counter.

10 Claims, 10 Drawing Sheets

(56) References Cited

U.S. PATENT DOCUMENTS

| | | | | |
|---|---|---|---|---|
| 2010/0091272 A1* | 4/2010 | Asada | ................... | G01N 21/55 |
| | | | | 356/237.2 |
| 2011/0286738 A1* | 11/2011 | Noda | ................. | H01L 21/6715 |
| | | | | 396/611 |
| 2013/0114074 A1* | 5/2013 | Nakajima | ............. | H01L 21/681 |
| | | | | 356/237.5 |
| 2018/0328721 A1* | 11/2018 | Hatcher, Jr. | ............ | G01B 11/14 |
| 2019/0011252 A1* | 1/2019 | Moeller | ............ | G01B 11/0625 |

FOREIGN PATENT DOCUMENTS

| | | | |
|---|---|---|---|
| JP | 2013533469 A | 8/2013 | |
| JP | 2014-083791 A | 5/2014 | |
| JP | 2015523577 A | 8/2015 | |

OTHER PUBLICATIONS

Notice of Reasons for Refusal issued by the Japanese Patent Office in relation to Japanese Application No. 2018-051179 dated Jan. 14, 2020 (4 pages) along with English language translation (4 pages).
Decision to Grant a Patent issued by the Japanese Patent Office in relation to Japanese Application No. 2018-051179 dated Mar. 3, 2020 (3 pages) along with English language translation (2 pages).
The automatic visual examination of the LSI wafer multilayer pattern by a differentiation polarity comparison method, IEICE Transactions on Information and Systems, Japan, Institute of Electronics, Information and Communication Engineers The Institute of Electronics, and Information and Communication the [Engineers, Jan. 1999, and]—a J82-D-II volume. (English translation is NOT available.).

* cited by examiner

INSPECTION APPARATUS AND INSPECTION METHOD

CROSS-REFERENCE TO RELATED APPLICATION

This application is based upon and claims the benefit of priority from Japanese Patent Application No. 2018-051179 filed on Mar. 19, 2018, the contents of which are incorporated herein by reference.

BACKGROUND OF THE INVENTION

Field of the Invention

The present invention relates to an inspection apparatus for inspecting an inspection object on which a coating layer is formed and an inspection method therefor.

Description of the Related Art

Japanese Laid-Open Patent Publication No. 2014-083791 discloses an apparatus including a coating unit that performs a coating process on a coating area of a sheet and an inspection unit that irradiates the coating area with black light, thereafter takes an image of the coating area with a camera, and determines whether coating is properly carried out or not on the basis of the taken image.

Specifically, when the entire coating area glows blue-white, it is determined that the coating has been done correctly, whereas when the coating area is composed of a mixture of blue-white glow areas and white glow areas, it is determined that the coating has not been done properly.

SUMMARY OF THE INVENTION

However, the apparatus disclosed in Japanese Laid-Open Patent Publication No. 2014-083791 can determine the presence or absence of coating on the coating area, but it is difficult for the apparatus to determine whether or not the applied coating layer has an appropriate thickness.

It is therefore an object of the present invention to provide an inspection apparatus capable of inspecting whether or not a coating layer has an appropriate thickness and a method of inspecting the same.

According to a first aspect of the present invention, an inspection apparatus for inspecting an inspection object having a coating layer includes: a plurality of light emitters configured to emit light beams each having an annular cross-section onto the coating layer; an imaging unit configured to take an image of a light beam reflected on the coating layer; a counter configured to count the number of annular light beam images per unit area in the image taken by the imaging unit; and a thickness determination unit configured to determine whether or not the thickness of the coating layer is acceptable, based on the number of the annular light beam images counted by the counter.

According to a second aspect of the present invention, an inspection method for use in an inspection apparatus for inspecting an inspection object having a coating layer includes: an emitting step of emitting light beams each having an annular cross-section from a plurality of light emitters onto the coating layer; an imaging step of taking an image of a light beam reflected on the coating layer; a counting step of counting the number of annular light beam images per unit area in the image taken at the imaging step; and a thickness determining step of determining whether the thickness of the coating layer is acceptable, based on the number of the annular light beam images counted at the counting step.

According to the present invention, it is possible to inspect whether or not the coating layer has an appropriate thickness.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The inspection apparatus according to the present invention will be detailed below, by describing preferred embodiments with reference to the accompanying drawings.

Embodiment

Figure 1:
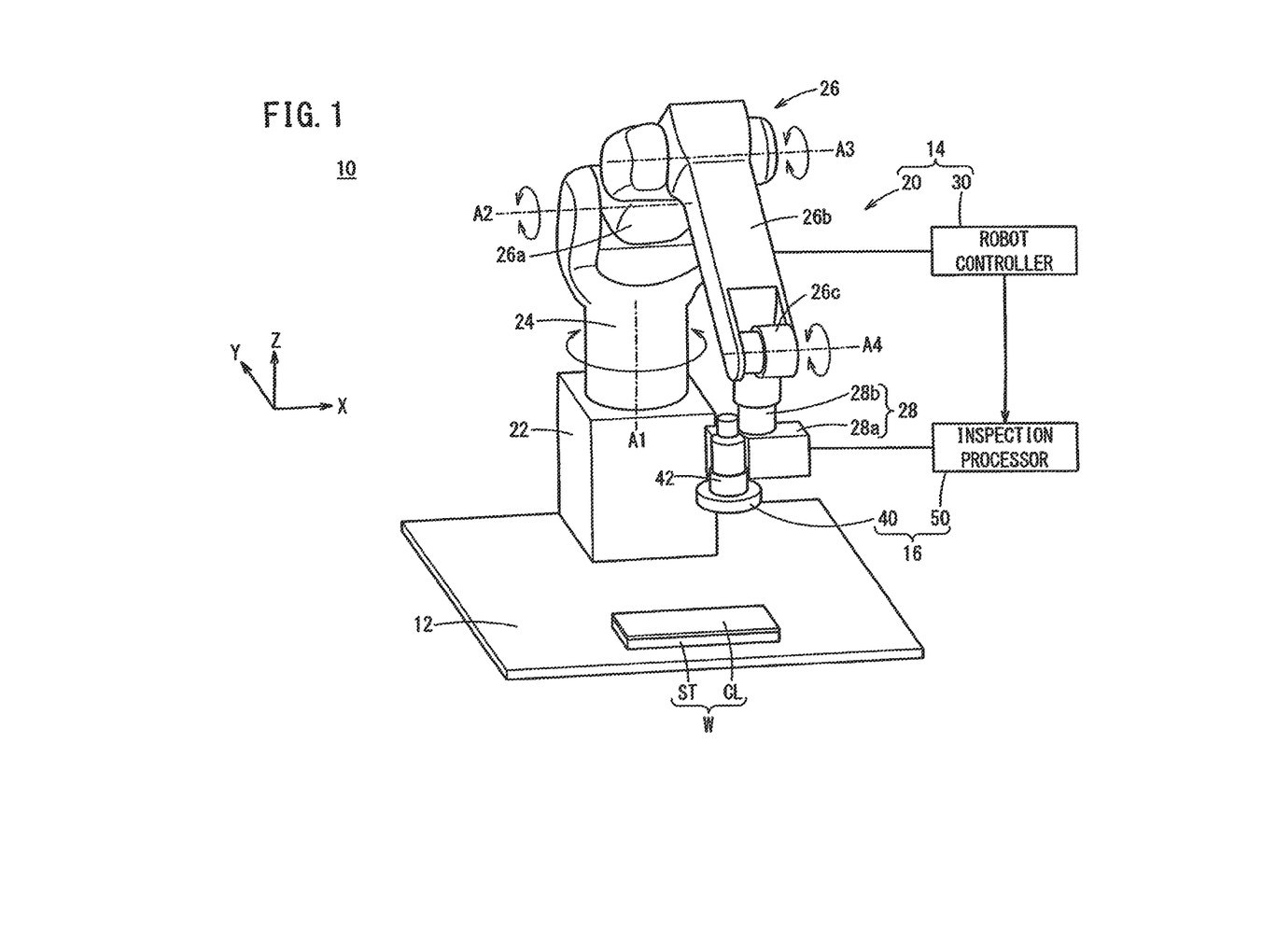
FIG. 1 is a schematic diagram showing an inspection system according to the present embodiment.

FIG. 1 is a schematic diagram showing an inspection system 10 of the present embodiment. The inspection system 10 is a system for inspecting the film thickness of a coating layer CL in an inspection object W, and includes an inspection table 12, an articulated robot 14, and an inspection apparatus 16.

The inspection object W has a substrate ST and the coating layer CL formed on a surface of the substrate ST, and is placed on the inspection table 12. In the present embodiment, it is assumed that the substrate ST has a substantially rectangular parallelepiped shape, and the coating layer CL is formed on the entire upper surface of the substrate ST. Note that the upper surface of the substrate ST is a surface opposite to a surface placed on the inspection table 12.

The substrate ST is, for example, a PWB (Printed Wiring Board), a PCB (Printed Circuit Board), a metal plate or the like. The coating layer CL is, for example, a coating material, a paint, an adhesive or the like. The coating layer CL may be in an uncured state or in a cured state as long as it is provided on the surface of the substrate ST.

The articulated robot 14 changes its position relative to the inspection object W placed on the inspection table 12, and includes a robot body 20 and a robot controller 30. The inspection apparatus 16 inspects the thickness (film thickness) of the coating layer CL, and includes an inspection device 40 and an inspection processor 50.

The robot body 20 has a support 22, a swing part 24, an arm part 26 and a hand part 28. The support 22 is a base or foundation of the robot body 20, and in the present embodiment the support is mounted on the inspection table 12.

The swing part 24 is mounted on the support 22 and pivots about a rotation axis A1 in the Z-direction relative to the support 22. The swing part 24 is rotated by an unillustrated motor. In the present embodiment, the Z-direction denotes the upward direction, and the direction opposite to the Z-direction is the downward direction. The downward direction is the direction of gravity.

The arm part 26 connects the swing part 24 and the hand part 28, and has one or multiple arms. In the present embodiment, the arm part 26 has three arms, namely, first, second and third arms 26a, 26b and 26c.

The first arm 26a is provided on the swing part 24 and rotates relative to the swing part 24 about a rotation axis A2 that is substantially perpendicular to the Z-direction. The second arm 26b is provided on the first arm 26a and rotates relative to the first arm 26a about a rotation axis A3 that is substantially parallel to the rotation axis A2. The third arm 26c is provided on the second arm 26b and rotates relative to the second arm 26b about a rotation axis A4 that is substantially parallel to the rotation axis A3. The first arm 26a, second arm 26b and third arm 26c are rotated by unillustrated motors.

The hand part 28 forms a distal end of the robot body 20, and has a frame 28a and a connector 28b that detachably connects the frame 28a to the arm part 26 (the third arm 26c).

The robot controller 30 is a computer including a processor and a memory, and individually controls the motors that drive the swing part 24, the first arm 26a, the second arm 26b and the third arm 26c so as to move the hand part 28 relative to the inspection object W.

Specifically, the robot controller 30 causes the hand part 28 to scan (move over) the coating layer CL of the inspection object W in the X- and Y-directions while keeping substantially constant a distance from the placement surface of the inspection table 12. When starting the scanning (moving) of the hand part 28, the robot controller 30 outputs an inspection start command to the inspection apparatus 16. When ending the scanning (movement), the controller outputs an inspection end command to the inspection apparatus 16.

Figure 2:
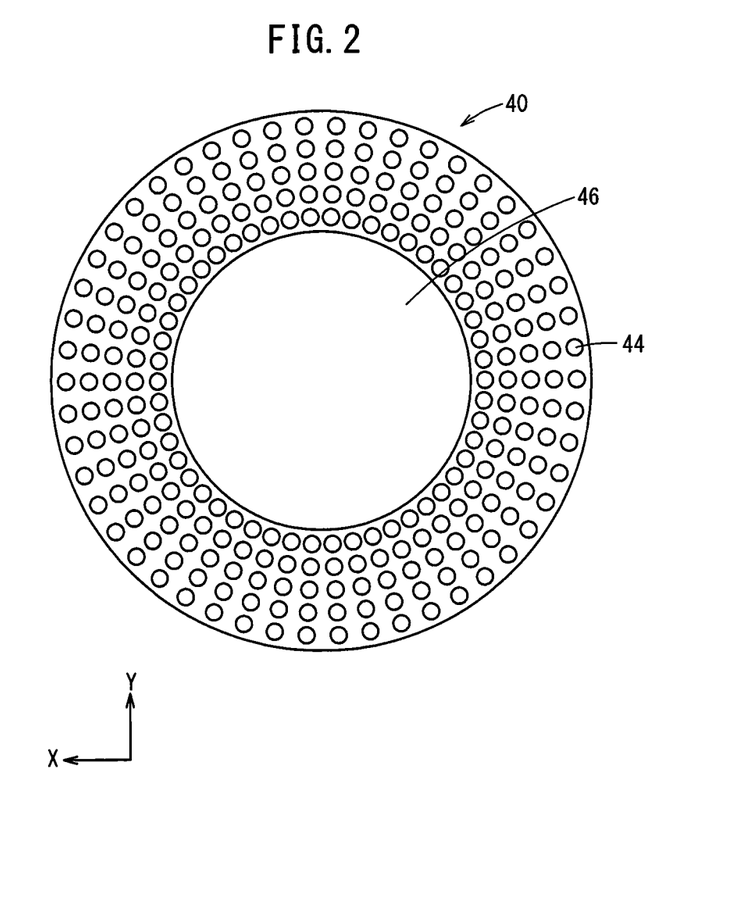
FIG. 2 is a schematic diagram showing the lower face side of the casing in the inspection device of FIG. 1.

The inspection device 40 has a casing 42. The casing 42 is fixed to the hand part 28 of the articulated robot 14. FIG. 2 is a schematic diagram showing the lower face side of the casing 42 in the inspection device 40. The inspection device 40 has a plurality of light emitters 44 and an imaging unit 46, which are arranged on the lower face side of the casing 42.

As described above, the distance between the coating layer CL (FIG. 1) formed on the inspection object W and the hand part 28 (FIG. 1), which is caused to scan (move over) the coating layer CL in the X- and Y-directions is substantially constant. Therefore, the distance between the coating layer CL, and the multiple light emitters 44 and the imaging unit 46 arranged on the lower face side of the casing 42 fixed to the hand part 28 is also substantially constant.

Each of the multiple light emitters 44 emits, onto the coating layer CL, a light (light beam) having an annular cross-section. The light having an annular cross-section is a light having a ring shape or annular shape in a cross-section orthogonal to the optical axis of light emitted from the light emitter 44 onto the coating layer CL. The ring shape or annular shape includes a circular shape and an ellipse shape.

In the case of the present embodiment, the multiple light emitters 44 are arranged at predetermined intervals so as to form multiple concentric circles. In the present embodiment, each light emitter 44 is an LED (Light Emitting Diode) capable of emitting visible light such as red light, white light and the like, and all the light emitters 44 emit light of substantially the same intensity.

The imaging unit 46 is configured to capture the light reflected on the coating layer CL, and includes a camera lens, a diaphragm, a shutter and an imaging device. In the case of the present embodiment, the imaging unit 46 is disposed at the center on the lower face of the casing 42, and is positioned inside the smallest circle formed of multiple light emitters 44.

Figure 3:
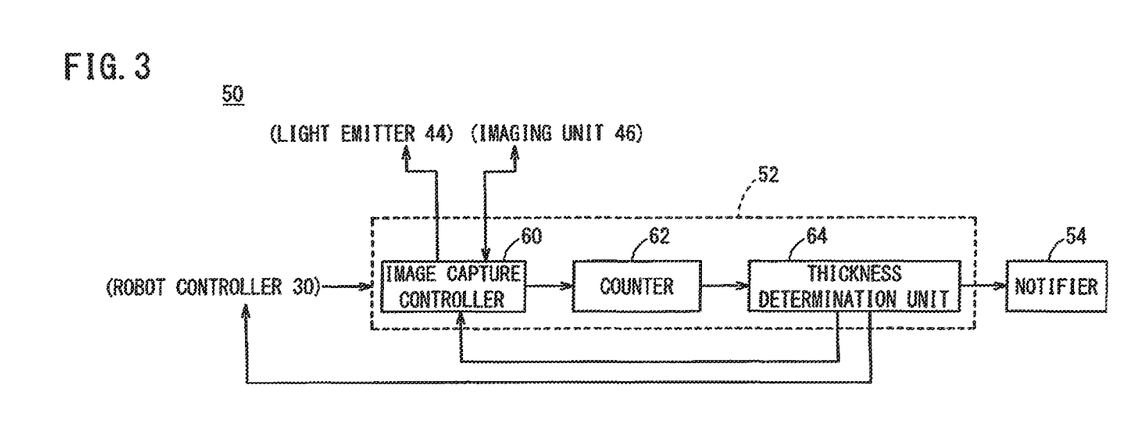
FIG. 3 is a block diagram showing a configuration of the inspection processor of FIG. 1.

FIG. 3 is a block diagram showing a configuration of the inspection processor 50. The inspection processor 50 includes a diagnosis unit 52 and a notifier 54. The diagnosis unit 52 diagnoses the thickness (film thickness) of the coating layer CL, and includes an image capture controller 60, a counter 62 and a thickness determination unit 64.

The image capture controller 60 controls the multiple light emitters 44 and the imaging unit 46 to thereby obtain an image of the reflected light from the coating layer CL (FIG. 1). That is, upon receiving the inspection start command from the robot controller 30, the image capture controller 60 lights up the multiple light emitters 44. Further, upon receiving the inspection start command from the robot controller 30, the image capture controller 60 causes the imaging unit 46 to start image taking.

As described above, the robot controller 30 outputs the inspection start command when starting the scanning of the coating layer CL in the X- and Y-directions by the hand part 28 (i.e., starting the moving of the hand part 28 over the coating layer CL in the X- and Y-directions). Therefore, the imaging unit 46 fixed to the hand part 28 moves, together with the hand part 28, over the coating layer CL while the distance from the coating layer CL is kept substantially constant.

Accordingly, the image capture controller 60 can control the imaging unit 46 to capture an image of each of multiple coating areas making up of the entire coating layer CL. The image capture controller 60 sequentially obtains the images of coating areas (hereinafter referred to as captured images) taken by the imaging unit 46, and outputs the obtained captured images to the counter 62.

Figure 4:
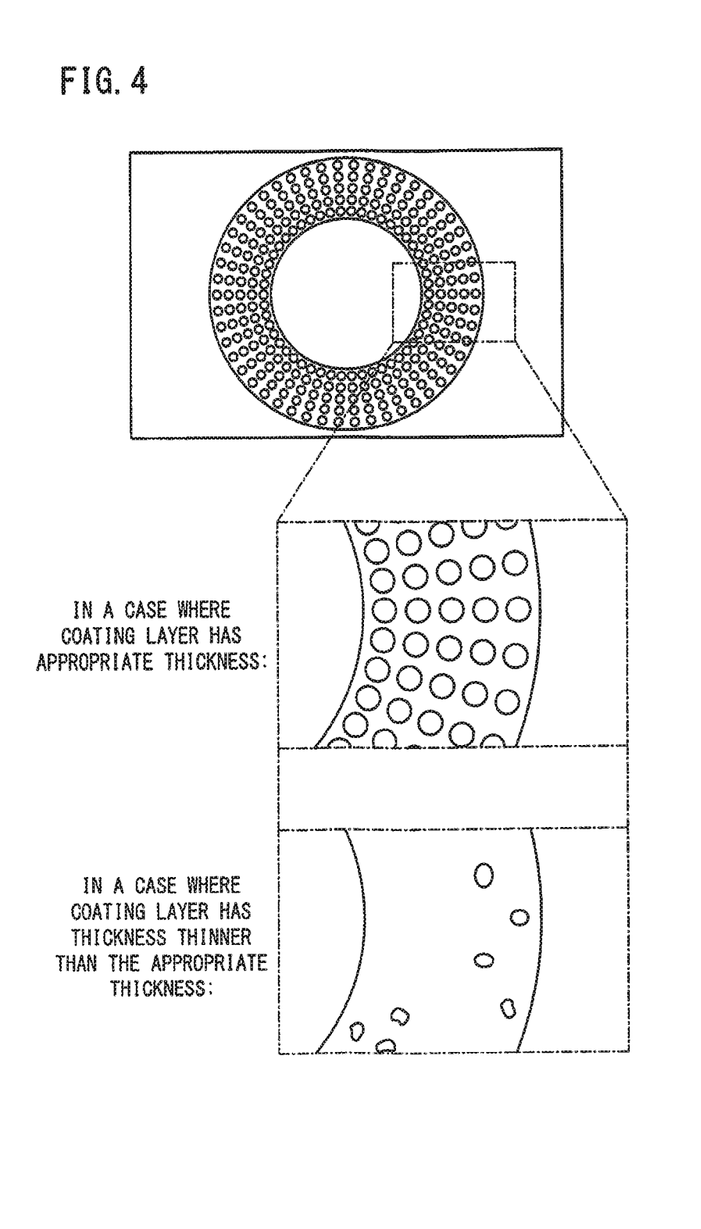
FIG. 4 is a conceptual diagram showing an image obtained from the imaging unit in FIG. 3.

Here, the relationship between the thickness of the coating layer CL (FIG. 1) and the result of the captured image of light beams emitted onto the coating layer CL from the light emitters 44 (light beam images included in the captured image) will be described. FIG. 4 is a conceptual diagram showing a captured image obtained from the imaging unit 46.

In a case where the coating layer CL is formed with an appropriate thickness, most of the light beams emitted onto the coating layer CL from the light emitters 44 are reflected by the coating layer CL without reaching the substrate ST, so that diffused reflection tends to be unlikely to occur. Therefore, when light beams with annular cross-sections incident on the coating layer CL are reflected, the light beams are likely to be image-taken as annular light beam images even if the surface of the substrate ST has irregularities.

On the other hand, when the thickness of the coating layer CL is thinner than the appropriate thickness, most of the light beams emitted onto the coating layer CL from the light emitters 44 tend to reach the substrate ST and be then diffusely reflected. Therefore, even if light beams having annular cross-sections are emitted onto the coating layer CL, the light beams are unlikely to be imaged as annular light beam images due to irregular reflection.

The number of such annular light beam images is counted by the counter 62 (FIG. 3). Returning to the explanation of FIG. 3, the counter 62 counts the number of annular light beam images per unit area from the captured image taken by the imaging unit 46.

In the present embodiment, the counter 62 identifies a region (hereinafter referred to as a light emitting region) where light beam images of multiple light emitters 44 are located, in the captured image, and divides the light emitting region into blocks for counting (or counting-target blocks), which each has a unit area. Since the position of the imaging unit 46 and the position of the multiple light emitters 44 have a fixed relationship, a captured image and the area where the multiple light emitters 44 are located in the captured image have also a fixed relationship accordingly. Therefore, the counter 62 can identify the light emitting region based on the relationship.

After dividing the light emitting region into blocks for counting, the counter 62 counts the number of annular light beam images in each of the divided blocks for counting, by using, for example, a pattern matching method. That is, the counter 62 holds a reference annular light beam image as a reference image. If an annular light beam image has a degree of similarity with the reference image that is equal to or greater than a predetermined similarity threshold, then the counter 62 counts the annular light beam image in. Upon completion of counting the number of annular light beam images in each divided block for counting, the counter 62 outputs the counted number of annular light beam images to the thickness determination unit 64.

The thickness determination unit 64 determines whether the thickness of the coating layer CL is acceptable or not (FIG. 1), based on the number of the annular light beam images counted by the counter 62 for each counting-target block (for each unit area). That is, the thickness determination unit 64 compares the number of annular light beam images in each counting-target block with a predetermined threshold.

In this procedure, the thickness determination unit 64 determines that the thickness of the coating layer CL is acceptable if the number of annular light beam images is equal to or greater than the predetermined threshold, for all the counting-target blocks. On the other hand, if any of the blocks for counting has the number of annular light beam images that is less than the predetermined threshold, the thickness determination unit 64 determines that the thickness of the coating layer CL is defective (i.e., not acceptable).

If no determination that the thickness of the coating layer CL is defective occurs at the time an inspection end command is received from the robot controller 30, the thickness determination unit 64 regards that the thickness of the coating layer CL is normal upon reception of the inspection end command, and implements a procedure for normal end.

That is, upon receiving the inspection end command from the robot controller 30, the thickness determination unit 64 generates a control stop command and outputs the generated control stop command to the image capture controller 60, to thereby turn off the multiple light emitters 44 and stop the control of the imaging unit 46. In addition, the thickness determination unit 64 generates a normal layer thickness signal and outputs the generated normal layer thickness signal to the notifier 54.

On the other hand, if determination that the thickness of the coating layer CL is defective occurs before receiving the inspection end command from the robot controller 30, at the time of the determination, the thickness determination unit 64 determines the thickness of the coating layer CL is abnormal and implements a procedure for abnormal end.

That is, when having determined that the thickness of the coating layer CL is defective, the thickness determination unit 64 outputs a control stop command to the image capture controller 60 to thereby turn off the multiple light emitters 44 and stop the control of the imaging unit 46 similarly to the above-described procedure for normal end. In addition, the thickness determination unit 64 stops the scanning by the hand part 28 (the moving of the hand part) by outputting a control stop command to the robot controller 30. The thickness determination unit 64 also generates an abnormal layer thickness signal and outputs the generated abnormal layer thickness signal to the notifier 54.

The notifier 54 issues a notification of the diagnosis result of the thickness of the coating layer CL by the diagnosis unit 52. That is, when receiving the normal layer thickness signal from the thickness determination unit 64, the notifier 54 notifies an operator that the thickness of the coating layer CL is acceptable. On the other hand, when receiving the abnormal layer thickness signal from the thickness determination unit 64, the notifier 54 notifies the operator that the thickness of the coating layer CL is defective.

Specific examples of the notifying method of the notifier 54 may include a method of displaying on a display, a method of generating sound from a sound generator, a method of generating light from a light indicator and the like. Note that the notifier 54 may have a display device, a sound generator or a light indicator, or may control a display unit, a sound generator or a light indicator, externally provided. In addition, the notifier 54 may use two or more notifying methods to give notice.

Figure 5:
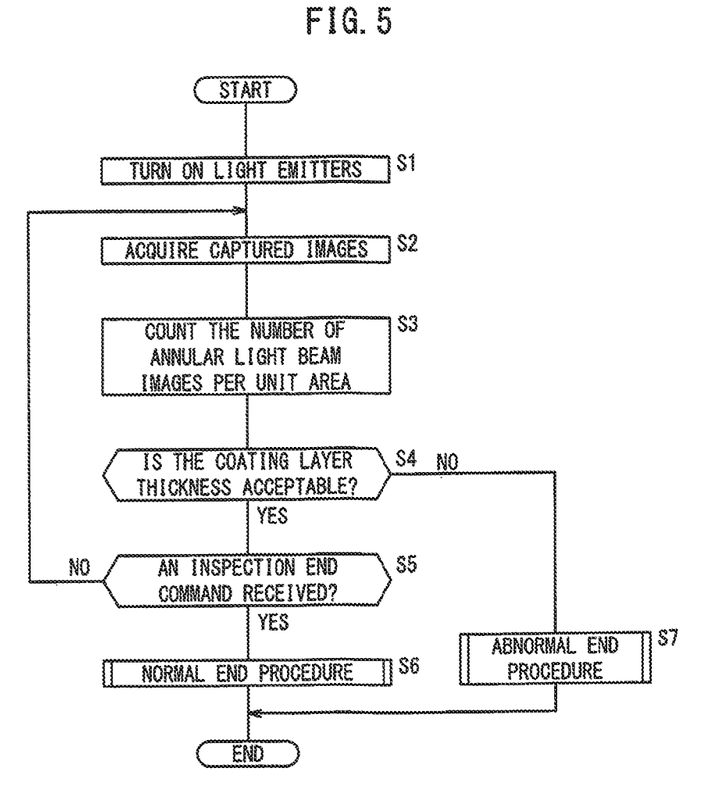
FIG. 5 is a flowchart showing a processing sequence of the inspection processor of FIG. 1.

Next, the inspection method of the inspection apparatus 16 will be described. FIG. 5 is a flowchart showing a processing sequence in the inspection processor 50.

At step S1, the image capture controller 60 turns on the multiple light emitters 44 when receiving the inspection start command from the robot controller 30, and then the control proceeds to step S2. At step S2, the image capture controller 60 acquires captured images from the imaging unit 46, and the control proceeds to step S3.

The counter 62 counts the number of annular light beam images in every predetermined counting block (unit area) from the captured images obtained at step S2, and then the control goes to step S4. At step S4, the thickness determination unit 64 compares the number of annular light beam images counted for each counting block at step S3 with the threshold, and determines whether or not the thickness of the coating layer CL is acceptable, based on the comparison result.

When, for all the counting blocks, the number of annular light beam images is equal to or greater than the threshold, the thickness determination unit 64 determines that the thickness of the coating layer CL is acceptable, and the control proceeds to step S5. At step S5, the thickness determination unit 64 determines whether or not the inspection end command has been received from the robot controller 30, and if not, the control returns to step S2. When having received the inspection end command, the thickness determination unit 64 proceeds to step S6 and executes the procedure for normal end.

That is, the thickness determination unit 64 turns off the multiple light emitters 44 and stops image-taking by the imaging unit 46. Further, the thickness determination unit 64 causes the notifier 54 to issue a notification that the thickness of the coating layer CL is acceptable. Then the inspection process is terminated.

On the other hand, in the case where, concerning the number of the annular light beam images counted at step S3, any of the counting-target blocks has the number of the annular light beam images that is less than the predetermined threshold, the thickness determination unit 64 determines that the thickness of the coating layer CL is defective. In this case, the control goes to step S7, and the thickness determination unit 64 executes the procedure for abnormal end.

That is, the thickness determination unit 64 turns off the multiple light emitters 44 and causes the imaging unit 46 to stop imaging. In addition, the thickness determination unit 64 stops the scanning by the hand part 28 (i.e., the moving of the hand part) and causes the notifier 54 to notify the operator that the thickness of the coating layer CL is defective. Then, the inspection process is terminated.

[Modifications]

Although the above embodiment has been described as an example of the present invention, the technical scope of the present invention should not be limited to that described in the above embodiment. It goes without saying that various modifications or improvements can be added to the above embodiment. It is obvious from the description of the scope of the claims that modes with such modifications or improvements can be included in the technical scope of the present invention.

Part of the modified or improved forms will be described below as Modifications. Note that constituent elements equivalent to those described in the above embodiment are denoted by the same reference numerals, and duplicate descriptions are omitted.

<Modification 1>

Figure 6:
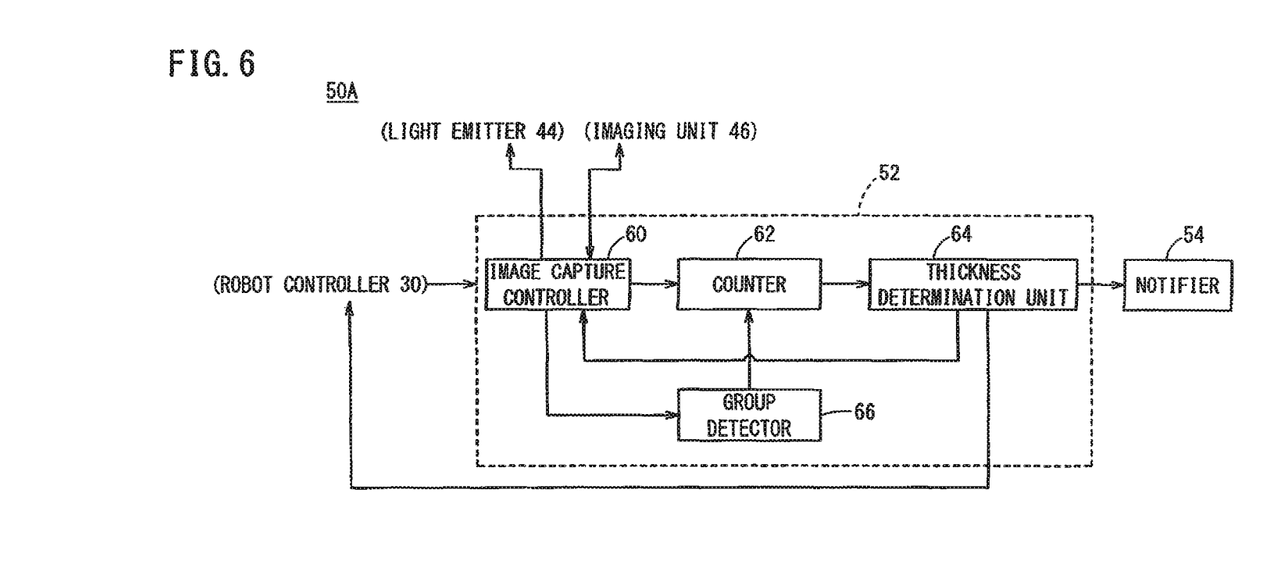
FIG. 6 is a block diagram showing a configuration of an inspection processor according to Modification 1.

FIG. 6 is a block diagram showing an inspection processor 50A of Modification 1. The inspection processor 50A of the variation example 1 is different from the inspection processor 50 of the above embodiment in that it additionally includes a group detector 66.

Figure 7:
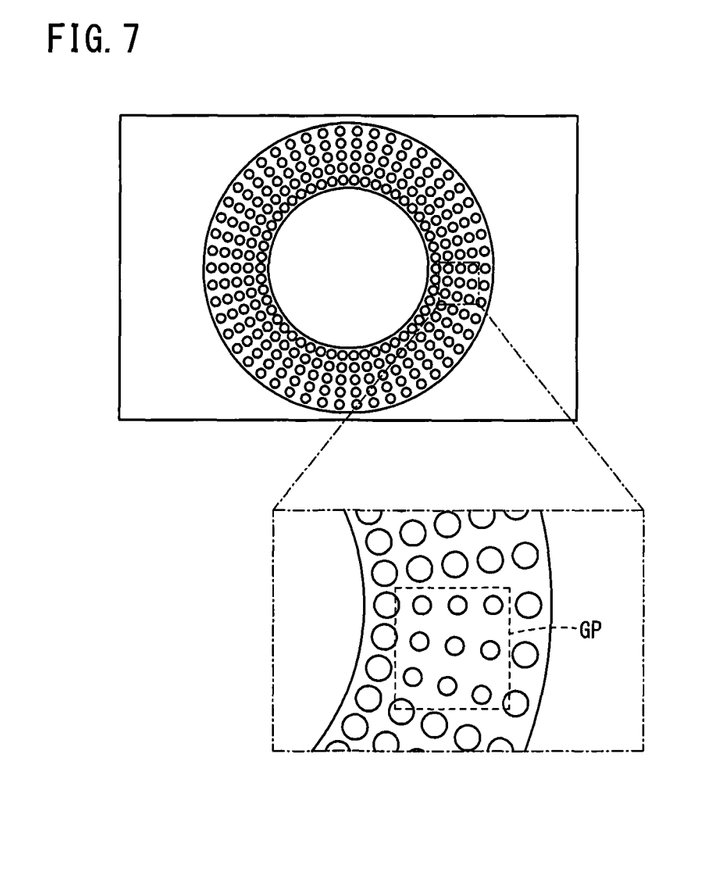
FIG. 7 is a conceptual diagram showing an image captured by the imaging unit in FIG. 6.

The captured image taken by the imaging unit 46 is supplied to the group detector 66 from the image capture controller 60. Now, the relationship between the size of the annular light beam image in the captured image and the unevenness of the coating layer CL will be explained. FIG. 7 is a conceptual diagram showing a captured image obtained from the imaging unit 46.

In a case where the surface of the substrate ST has irregularities, the thickness (film thickness) of the coating layer CL formed at a boundary portion between concavity and convexity of the irregularity tends to be thinner than the thickness (film thickness) of the coating layer CL formed on the flat portion. Therefore, the imaging result (annular light beam image) of the light beam reflected from the coating layer CL in the boundary portion of the irregularity tends to be smaller in size than the imaging result (annular light beam image) of the light beam reflected from the coating layer CL on the flat portion.

Therefore, when there is a group GP of annular light beam images that each have a predetermined size or smaller and lie adjacent to each other within a predetermined distance, a state of the coating layer CL formed at the irregular boundary portion tends to be easily reflected on such a Group GP.

The group detector 66 detects such a group GP of annular light beam images that each have a predetermined size or smaller and lie adjacent to each other within the predetermined distance, from the captured image taken by the imaging unit 46, and outputs the detected group GP to the counter 62.

The counter 62 counts the number of annular light beam images per unit area within the group GP detected by the group detector 66 from the captured images supplied from the image capture controller 60, and outputs the counted number of the annular light beam images to the thickness determination unit 64. Similarly to the above embodiment, the thickness determination unit 64 determines whether or not the thickness of the coating layer CL is acceptable, based on the number of annular light beam images counted by the counter 62.

As described above, the inspection processor 50A of Modification 1 determines whether or not the thickness of the coating layer CL is acceptable, based on the number of annular light beam images per unit area in the group GP of annular light beam images that each have a predetermined size or smaller and lie adjacent to each other within the predetermined distance. As a result, it is possible to intensively determine whether or not the thickness of the coating layer CL formed at the boundary portion of irregularities where the coating is prone to be thinner than at the flat portion as described above is acceptable.

<Modification 2>

Figure 8:
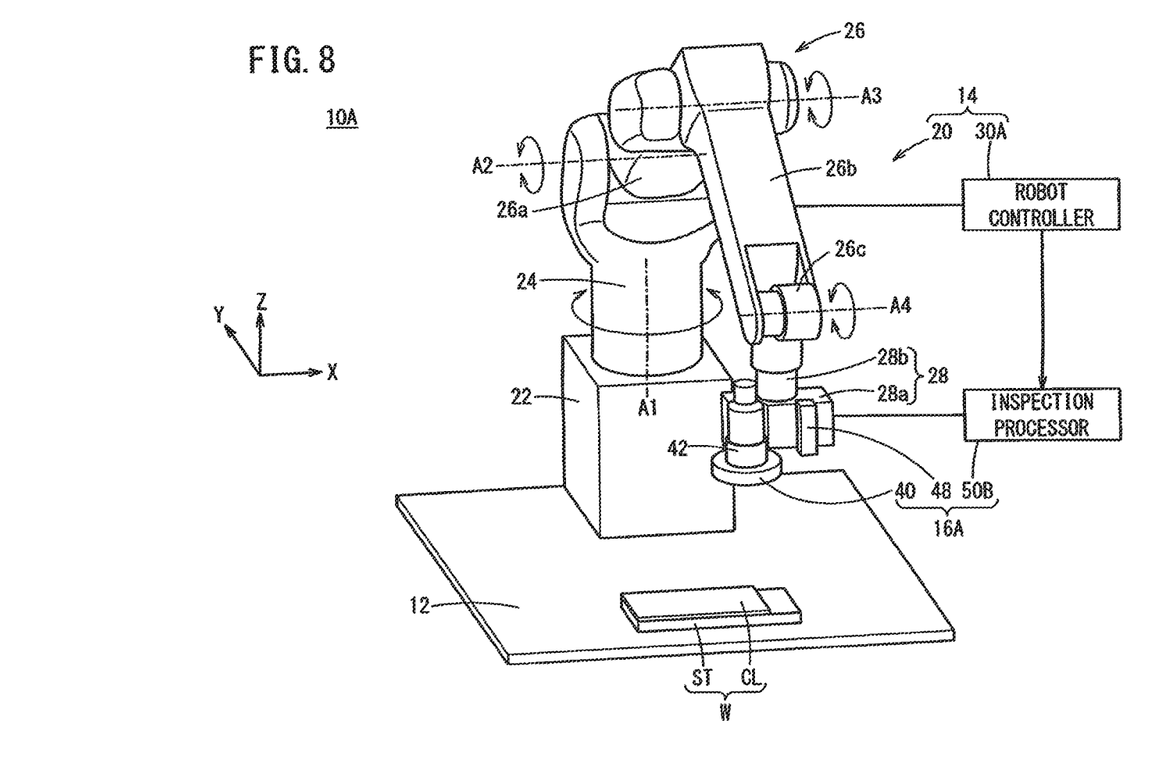
FIG. 8 is a schematic diagram showing an inspection system according to Modification 2.

FIG. 8 is a schematic diagram showing an inspection system 10A of Modification 2. The inspection system 10A of Modification 2 has two modes, i.e., a search mode for searching the inspection object W for a forming region where the coating layer CL is formed, and an inspection mode for inspecting the film thickness of the coating layer CL in the detected forming region.

This inspection system 10A is different from the inspection system 10 of the above embodiment in that a robot controller 30A replaces the robot controller 30 of the above embodiment and an inspection apparatus 16A replaces the inspection apparatus 16 of the above embodiment.

In the search mode, the robot controller 30A causes the hand part 28 to search and scan (move over) the inspection object W in the X- and Y-directions while keeping substantially constant the distance between the hand part 28 and the placement surface of the inspection table 12. When starting the searching and scanning (moving) by the hand part 28, the robot controller 30A outputs a search start command to the inspection apparatus 16A. When ending the searching and scanning (movement), the controller outputs a search end command to the inspection apparatus 16A.

The forming region is acquired by the inspection apparatus 16A from when the search start command is output until the search end command is output, and the obtained forming region is notified to the robot controller 30A. Upon receiving the notification of the forming region, the robot controller 30A starts operation of inspection mode. In the inspection mode, the robot controller 30A causes the hand part 28 to scan (move over) the coating layer CL (forming region) in the X- and Y-directions, similarly to the above embodiment.

The inspection apparatus 16A is different from the inspection apparatus 16 of the above embodiment in that it further includes a coating identification light source 48 and has an inspection processor 50B having a configuration different from that of the inspection processor 50 of the above embodiment.

The coating identification light source 48 emits light for searching the inspection object W for a forming region where the coating layer CL is formed. Examples of the light include black light for exciting a fluorescent substance contained in the coating layer CL to thereby emit light. The coating identification light source 48 is fixed to, for example, a portion of the hand part 28 that is different from the portion to which the casing 42 of the inspection device 40 is fixed.

In the search mode, the inspection processor 50B controls the coating identification light source 48 and the imaging unit 46 to obtain a forming region of the coating layer CL. On the other hand, in the inspection mode, the inspection processor 50B diagnoses the thickness (film thickness) of the coating layer CL (forming region) and informs an operator of the diagnosis result in the same manner as in the above embodiment.

Figure 9:
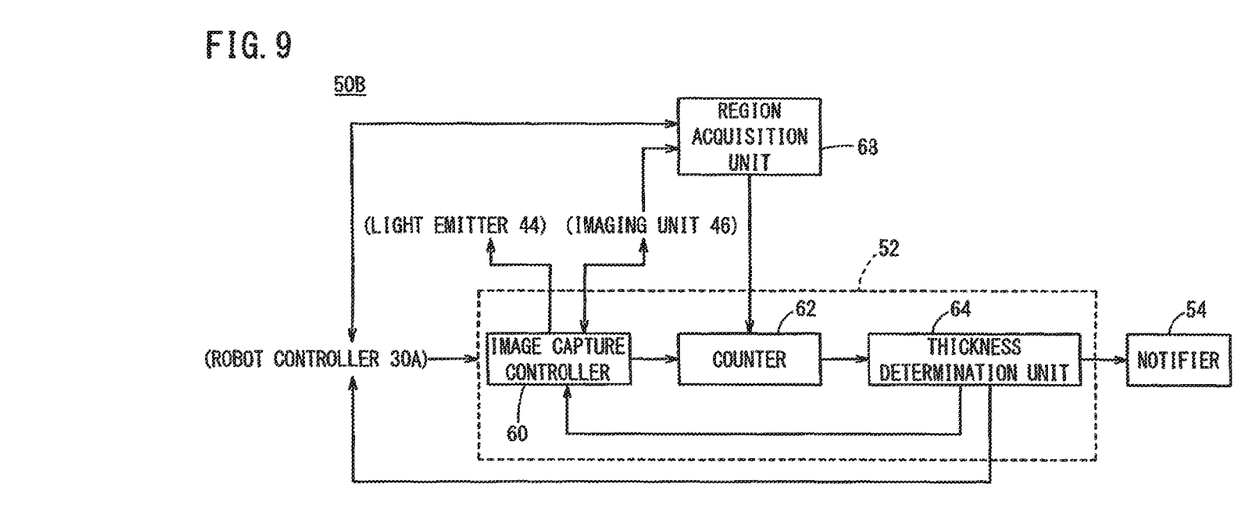
FIG. 9 is a block diagram showing a configuration of an inspection processor according to Modification 2.

FIG. 9 is a block diagram showing a configuration of the inspection processor 50B according to Modification 2. The inspection processor 50B of Modification 2 is different from the above-described embodiment in that it additionally has a region acquisition unit 68.

Images are captured in the search mode by the imaging unit 46 (hereinafter referred to as a search image) and supplied therefrom to the region acquisition unit 68. A search start command, a search end command and positional information are supplied from the robot controller 30A to the region acquisition unit 68. The positional information indicates the position (the relative position with respect to the inspection object W) of the hand part 28 which is caused to search and scan (moved over) the coating layer CL in the search mode.

The region acquisition unit 68 receives search images sequentially output from the imaging unit 46 and identifies a light emission region (e.g., a fluorescent emission region) contained in the search image, as a forming region of the coating layer CL, from reception of the search start command for the hand part 28 from the robot controller 30A until reception of the search end command. Further, based on the positional information supplied from the robot controller 30A, the region acquisition unit 68 recognizes which part of the inspection object W the identified forming region corresponds to.

As described above, the region acquisition unit 68 acquires the forming region of the coating layer CL, based on the images captured in a state where the fluorescent substance contained in the coating layer CL is excited to emit light, and notifies the robot controller 30A of the acquired forming region of the coating layer CL.

As described above, according to the inspection system 10A, since the forming region of the coating layer CL is obtained, it is possible to determine whether the thickness (layer thickness) of the coating layer CL is acceptable or not, within a limited region, i.e., the acquired forming region. Therefore, it is possible to avoid the process of determining the acceptability of the thickness (layer thickness) of the coating layer CL for an area of the inspection object W where no coating layer CL is formed, and hence omit useless processing.

Although the region acquisition unit 68 recognizes and acquires the forming region based on the images captured in a state where the fluorescent substance contained in the coating layer CL is caused to emit light, the region acquisition unit 68 may recognize and acquire the forming region, based on information on the forming region stored beforehand in the inspection processor 50B. With this configuration, even if the coating identification light source 48 or the like is not provided, it is possible to avoid a situation where unnecessary determination is made, i.e., a situation of determining the acceptability of the thickness (layer thickness) of the coating layer CL for an area where no coating layer CL needs to be formed.

When the forming region is stored in advance in the inspection processor 50B, the region acquisition unit 68 may determine whether the coating layer CL is formed within the forming region or not, based on the light emission region of the search images captured by the imaging unit 46 and the information on the forming region stored in advance.

<Modification 3>

Figure 10:
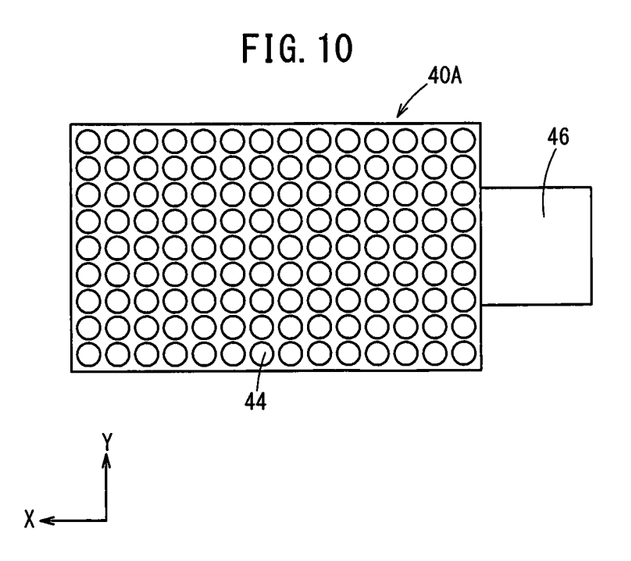
FIG. 10 is a schematic diagram showing the lower face side of the casing in the inspection device of Modification 3.

FIG. 10 is a schematic diagram showing the lower face side of the casing 42 of an inspection device 40A of Modification 3. In the inspection device 40A of Modification 3, the arrangement of multiple light emitters 44 and the imaging unit 46 is different from that of the above embodiment.

That is, in the above-described embodiment, multiple light emitters 44 are arranged apart from each other at predetermined intervals so as to form multiple concentric circles, whereas in Modification 3, multiple light emitters 44 are arranged apart from each other in a lattice manner at a predetermined pitch in the X- and Y-directions.

On the other hand, in the above embodiment, the imaging unit 46 is arranged inside the smallest circle formed of multiple light emitters 44, whereas in the modification 3, the imaging unit 46 is disposed outside the multiple light emitters 44.

Also in this case, similarly to the above embodiment, each of the multiple light emitters 44 emits a light beam having an annular cross-section onto the coating layer CL and the imaging unit 46 can take the image of the light beam reflected from the coating layer CL.

<Modification 4>

In the above embodiment, the multiple light emitters 44 and the imaging unit 46 are fixed to the hand part 28 of the articulated robot 14 that changes its relative position to the inspection object W. However, multiple light emitters and the imaging unit may be fixed to a member or the like that does not change its relative position to the inspection object W.

Further, though the inspection object W is placed on the inspection table 12, it may be conveyed to a position under the multiple light emitters 44 and the imaging unit 46 by means of a belt conveyor or the like.

<Modification 5>

The above embodiment and Modifications 1 to 4 may be arbitrarily combined as long as no technical inconsistency occurs.

[Technical Ideas]

Technical ideas that can be grasped from the embodiment and the modifications are described below.

<First Technical Idea>

The inspection apparatus (16, 16A) is configured to inspect an inspection object (W) having a coating layer (CL). This inspection apparatus (16, 16A) includes: a plurality of light emitters (44) configured to emit light beams each having an annular cross-section onto the coating layer (CL); an imaging unit (46) configured to take an image of a light beam reflected on the coating layer (CL); a counter (62) configured to count the number of annular light beam images per unit area in the image taken by the imaging unit (46); and a thickness determination unit (64) configured to determine whether or not the thickness of the coating layer (CL) is acceptable, based on the number of the annular light beam images counted by the counter (62).

The image of the light beam having the annular cross-section, incident on the coating layer (CL) and reflected on the coating layer (CL), is easily picked up as an annular light beam image even if the surface of the inspection object (W) on which the coating layer (CL) is formed is flat or uneven. Therefore, according to the inspection apparatus (16, 16A), in spite of the presence or absence of irregularities on the surface of the inspection object (W), it is possible to appropriately determine whether the coating thickness is acceptable or not, based on the number of annular light beam images per unit area.

The thickness determination unit (64) may be configured to determine that the thickness of the coating layer (CL) is acceptable if the number of the annular light beam images counted by the counter (62) is equal to or greater than a threshold, and determine that the thickness of the coating layer (CL) is defective if the number of the annular light beam images counted by the counter (62) is less than the threshold. This makes it possible to determine whether the thickness of the coating layer (CL) is acceptable or not in a more suitable manner.

The inspection apparatus (16) may further include a group detector (66) configured to detect a group (GP) of annular light beam images that each have a predetermined size or smaller and lie adjacent to each other within a predetermined distance, from the image taken by the imaging unit (46), and the counter (62) may be configured to count the number of the annular light beam images per unit area within the group detected by the group detector (66). This makes it possible to intensively determine whether the thickness of the coating layer (CL) formed at the boundary portion of irregularities where the coating is prone to be thinner than at the flat portion is acceptable or not.

The inspection apparatus (16A) may further include a region acquisition unit (68) configured to obtain a forming region in which the coating layer (CL) is formed, from the inspection object (W), and the counter (62) may be configured to count the number of the annular light beam images per unit area within the forming region obtained by the region acquisition unit (68). This makes it unnecessary to judge the propriety of the thickness (layer thickness) of the coating layer (CL) for a region where the coating layer (CL) is not formed on the inspection object (W), and hence makes it possible to eliminate wasteful processing.

The region acquisition unit (68) may be configured to obtain the forming region based on an image taken in a state where a fluorescent substance contained in the coating layer (CL) is caused to emit light. This makes it possible to acquire a region of the inspection object (W) where the coating layer (CL) intends to be formed, and hence it is possible to more appropriately determine whether the thickness of the coating layer (CL) is acceptable or not.

<Second Technical Idea>

An inspection method is used in an inspection apparatus (16, 16A) for inspecting an inspection object (W) having a coating layer (CL). This inspection method includes: an emitting step (S1) of emitting light beams each having an annular cross-section from a plurality of light emitters (44) onto the coating layer (CL); an imaging step (S2) of taking an image of a light beam reflected on the coating layer (CL); a counting step (S3) of counting the number of annular light beam images per unit area in the image taken at the imaging step (S2); and a thickness determining step (S4) of determining whether the thickness of the coating layer (CL) is acceptable, based on the number of the annular light beam images counted at the counting step (S3).

The image of the light beam having the annular cross-section, incident on the coating layer (CL) and reflected on the coating layer (CL), is easily picked up as an annular light beam image even if the surface of the inspection object (W) on which the coating layer (CL) is formed is flat or uneven. Therefore, according to the above inspection method, in spite of the presence or absence of irregularities on the surface of the inspection object (W), it is possible to appropriately determine whether the coating thickness is acceptable or not, based on the number of annular light beam images per unit area.

The thickness determining step (S4) may determine that the thickness of the coating layer (CL) is acceptable if the number of the annular light beam images counted at the counting step (S3) is equal to or greater than a threshold, and determines that the thickness of the coating layer (CL) is defective if the number of the annular light beam images counted at the counting step (S3) is less than the threshold. This makes it possible to determine whether the thickness of the coating layer (CL) is acceptable in a more suitable manner.

The inspection method for use in the inspection apparatus (16, 16A) may further include a group detecting step of detecting a group (GP) of annular light beam images that each have a predetermined size or smaller and lie adjacent to each other within a predetermined distance, from the image taken at the imaging step (S2), and the counting step (S3) may count the number of the annular light beam images per unit area within the group (GP) detected by the group detecting step. This makes it possible to intensively determine whether the thickness of the coating layer (CL) formed at the boundary portion of irregularities where the coating is prone to be thinner than at the flat portion is acceptable or not.

The inspection method for use in the inspection apparatus (16A) may further include a region acquisition step of obtaining a forming region in which the coating layer (CL) is formed, from the inspection object (W), and the counting step (S3) may count the number of the annular light beam images per unit area within the forming region obtained at the region acquisition step. This makes it unnecessary to determine the acceptability of the thickness (layer thickness) of the coating layer (CL) for a region where the coating layer (CL) is not formed on the inspection object (W), and hence makes it possible to eliminate wasteful processing.

The region acquiring step may obtain the forming region based on an image taken in a state where a fluorescent substance contained in the coating layer (CL) is caused to emit light. This makes it possible to acquire a region of the inspection object (W) where the coating layer (CL) intends to be formed, and hence it is possible to more appropriately determine whether the thickness of the coating layer (CL) is acceptable or not.

What is claimed is:

1. An inspection apparatus for inspecting an inspection object having a coating layer, comprising:
    a plurality of light emitters configured to emit light beams each having an annular cross-section onto the coating layer;
    an imaging unit configured to take an image of a light beam reflected on the coating layer;
    a counter configured to count number of ring- or ellipse-shaped light beam images per unit area in the image taken by the imaging unit; and a thickness determination unit configured to determine whether or not a thickness of the coating layer is acceptable, based on the number of the ring- or ellipse-shaped light beam images counted by the counter.

2. The inspection apparatus according to claim 1, wherein the thickness determination unit is configured to determine that the thickness of the coating layer is acceptable if the number of the ring- or ellipse-shaped light beam images counted by the counter is equal to or greater than a threshold, and determine that the thickness of the coating layer is defective if the number of the ring- or ellipse-shaped light beam images counted by the counter is less than the threshold.

3. The inspection apparatus according to claim 1, further comprising a group detector configured to detect a group of ring- or ellipse-shaped light beam images that each have a predetermined area or smaller and lie adjacent to each other within a predetermined distance, from the image taken by the imaging unit,
wherein the counter is configured to count the number of the ring- or ellipse-shaped light beam images per unit area within the group detected by the group detector.

4. The inspection apparatus according to claim 1, further comprising a region acquisition unit configured to obtain a forming region in which the coating layer is formed, from the inspection object,
wherein the counter is configured to count the number of the ring- or ellipse-shaped light beam images per unit area within the forming region obtained by the region acquisition unit.

5. The inspection apparatus according to claim 4, wherein the region acquisition unit is configured to obtain the forming region based on an image taken in a state where a fluorescent substance contained in the coating layer is caused to emit light.

6. An inspection method for use in an inspection apparatus for inspecting an inspection object having a coating layer, comprising:
an emitting step of emitting light beams each having an annular cross-section from a plurality of light emitters onto the coating layer;
an imaging step of taking an image of a light beam reflected on the coating layer;
a counting step of counting number of the ring- or ellipse-shaped light beam images per unit area in the image taken at the imaging step; and
a thickness determining step of determining whether a thickness of the coating layer is acceptable, based on the number of the ring- or ellipse-shaped light beam images counted at the counting step.

7. The inspection method according to claim 6, wherein the thickness determining step determines that the thickness of the coating layer is acceptable if the number of the ring- or ellipse-shaped light beam images counted at the counting step is equal to or greater than a threshold, and determines that the thickness of the coating layer is defective if the number of the ring- or ellipse-shaped light beam images counted at the counting step is less than the threshold.

8. The inspection method according to claim 6, further comprising a group detecting step of detecting a group of ring- or ellipse-shaped light beam images that each have a predetermined area or smaller and lie adjacent to each other within a predetermined distance, from the image taken at the imaging step,
wherein the counting step counts the number of the ring- or ellipse-shaped light beam images per unit area within the group detected by the group detecting step.

9. The inspection method according to claim 6, further comprising a region acquisition step of obtaining a forming region in which the coating layer is formed, from the inspection object,
wherein the counting step counts the number of the ring- or ellipse-shaped light beam images per unit area within the forming region obtained at the region acquisition step.

10. The inspection method according to claim 9, wherein the region acquiring step obtains the forming region based on an image taken in a state where a fluorescent substance contained in the coating layer is caused to emit light.

* * * * *